United States Patent [19]

Valentine

[11] Patent Number: 4,587,300

[45] Date of Patent: May 6, 1986

[54] LOW DENSITY, POLYBUTADIENE BASED, WET FILAMENT WINDING RESIN

[75] Inventor: Robert H. Valentine, Sandy, Utah

[73] Assignee: Hercules Incorporated, Wilmington, Del.

[21] Appl. No.: 744,454

[22] Filed: Jun. 13, 1985

Related U.S. Application Data

[60] Continuation of Ser. No. 674,448, Nov. 23, 1984, abandoned, which is a division of Ser. No. 554,665, Nov. 23, 1983, Pat. No. 4,499,240.

[51] Int. Cl.$^4$ ............................................... C08L 53/00
[52] U.S. Cl. ...................................... 525/95; 156/175; 264/176 F; 264/184; 428/36; 525/99
[58] Field of Search .................................... 525/95, 99

[56] References Cited

U.S. PATENT DOCUMENTS

| | | | |
|---|---|---|---|
| 3,616,193 | 5/1968 | Lubowitz et al. | 428/265 |
| 3,635,891 | 1/1972 | Lubowitz et al. | 525/111 |
| 3,644,584 | 2/1972 | Fryd | 525/301 |
| 3,751,522 | 5/1973 | Lachowicz et al. | 525/289 |
| 3,751,523 | 5/1973 | Lachowicz et al. | 525/289 |
| 3,860,672 | 1/1975 | Legally | 525/126 |
| 3,925,275 | 12/1975 | Musashi et al. | 525/278 |
| 4,065,521 | 12/1977 | Lachowicz et al. | 525/310 |
| 4,268,433 | 5/1981 | Sawatasi et al. | 525/193 |
| 4,288,480 | 9/1981 | Grzywinski et al. | 525/99 |

*Primary Examiner*—Jacob Ziegler
*Attorney, Agent, or Firm*—Edmund C. Ross, Jr.

[57] ABSTRACT

Disclosed are wet filament winding resins that are intimate admixtures consisting essentially of polybutadiene polymers whose functionality resides solely in unsaturation, an unsaturated monomer component, a peroxide free-radical initiator and a block copolymer impact modifier. The resins have long pot lives and cure into low density resin matrices in composite structures. The resin matrices can have select mechanical properties of desired character through ingredient choice.

6 Claims, No Drawings

LOW DENSITY, POLYBUTADIENE BASED, WET FILAMENT WINDING RESIN

This application is a continuation of application Ser. No. 674,448, filed Nov. 23, 1984, now abandoned, which is a division of Ser. No. 554,665, filed Nov. 23, 1983, now U.S. Pat. No. 4,499,240.

This invention relates to liquid resin compositions suitable for use in forming the resin matrix of filament wound structures. More particularly, this invention relates to such compositions which are wet filament winding resins especially adapted for reducing the weight of the resulting filament wound structures.

As used herein, the terminology "wet filament winding resin" means a liquid resin composition, the use of which is in filament winding for impregnating of the filaments immediately prior to winding thereof about a mandrel.

The wet filament winding resins of this invention incorporate substantially unmodified polybutadiene polymers. Polybutadiene polymers modified by graft polymerization and the like have been suggested for use in making filamentary composites. See, for example, U.S. Pat. Nos. 3,644,584; 3,751,522; 3,751,523; and 4,065,521. The use of modified polybutadiene polymers differs from the present invention where polybutadiene is a physical mixture that undergoes crosslinking during cure into the final desired shape.

U.S. Pat. No. 4,268,433 suggests use of halogenated materials to impart flame retardation to a butadiene resin. Viscosity of these systems appears to be too high for effective use as filament winding resins. Moreover, the addition of halogenated material disclosed in U.S. Pat. No. 4,268,433 increases the density of resins systems.

Functionally terminated butadiene resins have been extensively considered for use in crosslinkable compositions as is seen from the following patents: U.S. Pat. Nos. 3,616,193; 3,635,891; and 3,860.672. In polybutadienes disclosed in these patents, functional groups such as hydroxyl, carboxyl and amine groups on the butadiene chain play a role in the cure reaction of the resin. In resins of the present invention there are no functional groups substituted or grafted onto the polybutadiene prior to final cure.

The use of elastomers to modify epoxy resins has been known for years. (See for example, F. J. McGarry, Proc. Roy., Soc. London, A319, 59 (1970); F. J. McGarry and A. Wellner, Research Report R68-6, School of Engineering, Massachusetts Institute of Technology, 1968; and T. T. Wang and H. M. Zupko, Journal of Applied Polymer Science, Vol. 26 2391–2401 (1981)). In these cases the rubber domains are usually formed in-situ during the cure process. However, the use of block copolymers or thermoplastic elastomers of the triblock copolymer types has not received attention in the modification of wet filament winding butadiene based resin systems.

This invention may be summarized as relating to: a wet filament winding resin having a viscosity which is between about 1,000 and 5,000 centipoise at a temperature in a range between about 20° and 60° C., a density below about 1.05 grams/cubic centimeter at 25° C. after cure and a pot life which is up to about four months or more at 25° C. where pot life is defined as the time for a winding resin to reach a viscosity of 5,000 centipoise at the winding temperature, said wet filament winding resin being an intimate admixture of components consisting essentially of: (a) a cross-linkable polymer component in an amount at least about 30% by weight of the resin, the polymer component consisting essentially of unsaturated polybutadiene polymers essentially free of crosslinkable functionality other than the unsaturation thereof, 100 parts by weight of the unsaturated polybutadiene polymers being a first, medium molecular weight, polybutadiene having a number average molecular weight between about 8,000 and 100,000 and a 1,2 vinyl content between 50 and 95% based on total unsaturation present in the first polybutadiene and between about 5 and 100 parts by weight of a second, low molecular weight, polybutadiene having a number average molecular weight lower than the first polybutadiene and between about 900 and 8,000 and a 1,2 vinyl content between about 1 and 95% based on total unsaturation present in the second polybutadiene; (b) between about 5 and 150 parts by weight per 100 parts by weight of the first polybutadiene of an unsaturated monomer component that has a lower viscosity than the crosslinkable polymer component, the unsaturated monomer component comprising a monomer having a carbon carbon double bond; (c) between about 1 and 10 parts by weight per 100 parts by weight of the first polybutadiene of an initiator component comprising a peroxide-free radical initiator having a 10 hour half life at a temperature greater than 55° C.; and (d) between about 0 and 70 parts by weight per 100 parts by weight of an impact modifier component comprising a block polymer that has a first block consisting of aromatic units and a second block consisting of olefinic units whereby the block polymer is a thermoplastic elastomer.

More specifically, the preferred wet filament winding resins of this invention are characterized in Table A below:

TABLE A

|  | Parts by Weight | |
| --- | --- | --- |
|  | Preferred | More Preferred |
| Medium molecular weight preferably high 1,2 vinyl polybutadiene | 100 | 100 |
| Low molecular weight polybutadiene | 5–100 | 5–20 |
| Unsaturated reactive modifiers | 5–150 | 90–130 |
| Peroxide-free radical initiators | 1.0–10.0 | 4.0–7.5 |
| Impact modifier | 0–70 | 2.5–35 |

The medium molecular weight polybutadiene has a number average molecular weight ranging between about 8,000 and 100,000 with a preferred range between about 10,000 and 40,000. The 1,2-vinyl content of the medium molecular weight polybutadiene ranges between about 50% and 95%; a preferred range is between about 80–95% 1,2 vinyl.

The low molecular weight polybutadiene has a molecular weight between about 900 and 8,000 with a preferred range being between about 1000 and 2500. The 1,2 vinyl content of the low molecular weight polybutadiene range between about 1 and 95%, more preferably 35 and 55% 1,2 vinyl. (As used herein, the terminology 1,2 vinyl refers to a polymeric unit derived from butadiene monomer and having the configuration:

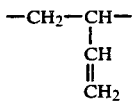

wherein the unit may be terminal or in the backbone of the polybutadiene).

The unsaturated reactive monomers contain allyl, vinyl, isopropenyl, acrylate, or methacrylate functionality. These monomers may be used alone or together in the wet winding resins. Methacrylates are generally preferred over the acrylates because they are less dense, less viscous, less reactive and higher boiling. Examples of suitable unsaturated reactive monomers include the following: styrene; methylstyrene; vinyltoluene; divinylbenzene; t-butylstyrene; m-and/or p-diisopropenylbenzene; diallylphthalate; diallylmaleate; triallylcyanurate; laurylmethacrylate, isodecylmethacrylate; cyclohexylethacrylate, tetrahydrofurfurylmethacrylate; isobornylmethacrylate; dicyclopentenyloxyethylmethacrylate; tetraethyleneglycoldimethacrylate; 1,6-hexanedioldimethacrylate; 1,3-butyleneglycoldimethacrylate and trimethylolpropanetrimethacrylate; and vinyl ester monomers such as the reaction product between a Bisphenol A epoxy and methacrylic acid or acrylic acid, the reaction product between a novalac epoxy and methacrylic acid or acrylic acid and the reaction product between an aromatic epoxy and methacrylic acid or acrylic acid.

The peroxide-free radical initiators suitable for use in the wet filament winding resins are selected from the following: peroxyketal peroxides; peroxyester peroxides and dialkyl peroxides. Examples of these peroxides include: 1,1-di(t-butylperoxy) 3,3,5-trimethylcyclohexane; t-butyl-peroxy-2-ethylhexanoate; t-butyl-butylperoxybenzoate; 2,5-dimethyl-2,5-di-(benzoylperoxy)-hexane; t-butylperoxymaleic acid; dicumyl peroxide; 2,5-dimethyl-2,5-di(t-butylperoxy)hexane and di-t-butylperoxide.

The 10 hour half life temperature for the peroxide-free radical initiators is at least about 55° C. (As used herein, the terminology "10 hour half life temperature" refers to the temperature at which one half by weight of the initiator is lost in ten hours). It is preferred that more than one initiator be used to cure the resins; also the 10 hour half life temperature of one of the initiators is preferably between about 90° and 110° C. while the second initiator has a 10 hour half life temperature at least 10° C. greater than that of the first. A typical cure cycle using these peroxides is one hour at 93° C. plus 1 hour at 110° C. plus 1 hour at 127° C. plus 6 hours at 143° C.

Impact modifiers for use in the wet filament winding resins of this invention are di- or tri-block copolymers where one block comprises a polyaromatic alkylene polymer such as polystyrene and the other block is elastomeric polymer such as polybutadiene, polyisoprene, acrylonitrile or a polyolefin. The preferred material is the triblock copolymer where the end blocks are polystyrene and the central block or blocks are elastomeric and comprise a polydiene such as polyisoprene or polybutadiene.

The wet filament winding resins of this invention have several essential characteristics. The upper limit of the viscosity is around 5,000 centipose (cps) at the winding temperature with a preferable range being 1,000–3,000 cps; the preferred winding temperature of 70°–90° F. Also, the resins contain only reactive components as non-reactive diluents or modifiers can give off volatile material causing excess porosity in finished parts.

The resin systems of this invention have viscosities that allow winding at room temperature, e.g., 70°–110° F.; however, heating may be used to wind at temperatures up to about 125° F. for lower viscosity.

The medium weight high vinyl polybutadiene provides the main structural backbone of the cured resins. The use of low molecular weight polybutadiene material can help lower the viscosity, if desired. Decreasing the vinyl content with the associated increase in 1,4-cis and trans of the low molecular weight polybutadiene allows the modulus (stiffness) of the cured resin to be varied to meet different requirements. This is accomplished because the cis and trans unsaturation are less reactive and leave flexible segments in the cured resin. In addition, the cis, trans unsaturation helps reduce the amount of internal cyclization caused by the reaction of the pendent 1,2-vinyl unsaturation.

The reactive unsaturated modifiers are useful in viscosity control and in modifying heat distortion temperature, tensile modulus and tensile elongation of the cured resins. For example, t-butylstyrene reduces viscosity of the wet winding resins. The reactive modifier that can help give exceptional viscosity reduction is t-butyl styrene. Isobornylmethacrylate helps improve the heat distortion temperature (HDT) of the cured resins while the multifunctional trimethlolpropane trimethacrylate improves modulus, the tetraethyleneglycol dimethacrylate with its flexible center portion improves elongation. It is to be recognized that in multicomponent systems that when a modifier changes one property of the cured resin there may also be changes in a second property. For example, an increase in HDT may be accompanied by an increase in modulus or an increase in modulus may be associated with a decrease in elongation.

The wet filament winding resins, when cured, have a density of less than about 1.05 grams per cubic centimeters (gm/cc) and may be as low as 0.99 gm/cc or less. This allows for the production of components that weigh significantly less than more common epoxy or vinyl ester winding resins without sacrificing physical and mechanical properties. In addition, the use of non-functional polybutadiene results in a resin system that, when completely formulated, can be stored at room temperature for over four months without apparent loss in physical properties in the resulting cured structures. Still further, the non-polar backbone of the non-functional polybutadiene resins gives these resins more hydrolytic stability than the polar epoxy resins and also makes the cured resin very transparent to radar.

Articles that can be produced by filament winding range from simple tubes, and storage tanks to complex pressure vessels and rocket motor cases.

EXAMPLES

The composition and physical properties of examples I–IV are given in Table I while those of the rubber modified examples, V–VII, are given in Table II. Identification and source of the ingredients used are given in Table III.

EXAMPLE I

A wet filament winding resin comprising a medium molecular polybutadiene (Ricon 159) having a 1,2-vinyl content of about 90%, a lesser amount of a 40-50% 1,2 vinyl low molecular weight polybutadiene resin (Lithene PM), three unsaturated reactive modifiers and two peroxides was made by stiring all the components in a container for about 15 minutes. The resulting mixture was cured in a step cure resulting in a resin that had the properties listed in Table I. The resin was wound in a 6″ diameter pressure bottle which had a burst pressure of 3475 psi and a efficiency factor (pv/w where p equals burst pressure, V is volume of the bottle and W is weight of the bottle) of $1.30 \times 10^6$ inch.

EXAMPLE II

A mixture was made in which the amount of low molecular weight polybutadiene was greatly increased relative to Example I. Small changes were made in the reactive modifiers. The result was a resin which, when cured, had a modulus over 30% lower than the cured resin of Example I.

EXAMPLE III

This example had an amount of low molecular weight polybutadiene that equaled the amount of Ricon 159. This produced a resin which, when cured, had a modulus of 70% lower than the cured resin of Example I and which also had a greatly increased strain (elongation).

EXAMPLE IV

The unsaturated reactive modifier in Example I, (t-butylstyrene) was replaced by IBOMA. This resulted in a resin system with a much higher viscosity that had to be heated to 50° C. to obtain the proper viscosity for wet filament winding. Physical properties were similar to those obtained from the cured resin of Example I. The higher viscosity of the material can be useful in holding the reinforcement fiber in place on the wound structure prior to cure.

EXAMPLE V

To the resin of Example I was added 1% of Kraton D-1101 to modify the impact strength. Kraton D-1101 is a triblock thermoplastic elastomer made by Shell Chemical Company. The end blocks are styrene, while the center segment is polybutadiene. Fracture energy was increased by 100% over Example I. Six inch diameter pressure vessels were made and had a burst strength of 3587 psi and an efficiency factor PV/W of $1.35 \times 10^6$ inch. Both the burst strength and efficiency factor were greater than those resulting from use of the resin in Example I.

EXAMPLE VI

This resin was identical to the one in Example V except that the Kraton D-1101 was replaced by Kraton G-1652 in which the center block was a saturated polyolefin rubber. Cured samples showed very small cloudy spots indicative of a phase separation. Increasing the amount of G-1652 in subsequent tests was found to increase the size of the cloudy spots.

EXAMPLE VII

This resin was identical to the one in Example I except that the Kraton D-1101 was replaced by Kraton D-1111-2 in which the center block is a polyisoprene rubber.

TABLE I

| Ingredient | EXAMPLE | | | |
|---|---|---|---|---|
| | I | II | III | IV |
| Polybutadiene (MW 14000)[1] | 100 | 100 | 100 | 100 |
| Polybutadiene (MW 1300)[2] | 15 | 50 | 100 | 60 |
| T-butyl styrene[3] | 100 | 100 | 100 | — |
| Tetraethylene glycol dimethacrylate[4] | 15 | 30 | — | 30 |
| Trimethylolpropane trimethacrylate[5] | — | 30 | 25 | — |
| Isobornyl methacrylate[6] | 45 | — | — | — |
| Hydrogenated polybutadiene[7] | — | 20 | — | — |
| T-butyl perbenzoate[8] | 2.75 | 3.1 | 3.2 | 2.90 |
| 2,5-Dimethyl-2,5-di(t-butyl peroxy) hexane[9] | 4.13 | 4.7 | 4.9 | 4.35 |
| Properties | | | | |
| density, gm/cc | 0.980 | 0.996 | 0.978 | — |
| viscosity, cps, 25° C. | 1446 | 2244 | 2284 | 1446 (50° C.) |
| HDT, °C. | 96 | 78 | 37 | — |
| tensile stress, PSI | 6550 | 4450 | 2233 | 3734 |
| tensile modulus, KSI | 372 | 234 | 104.4 | 245 |
| elongation, % | 2.0 | 3.21 | 9.0 | 1.61 |
| fracture energy, KJ/m² | 0.1105 | — | — | — |

TABLE II

| Ingredient | EXAMPLE | | |
|---|---|---|---|
| | V | VI | VII |
| Polybutadiene (MW 14000)[1] | 100 | 100 | 100 |
| Polybutadiene (MW 1300)[2] | 15 | 15 | 15 |
| T-butylstyrene[3] | 111 | 111 | 188 |
| Tetraethylene dimethacrylate[4] | 15 | 15 | 15 |
| Isobornylmethacrylate[6] | 45 | 45 | 45 |
| Styrene butadiene block copolymer[10] | 2.75 | — | — |
| Styrene isoprene block copolymer[11] | — | — | 22 |
| Styrene saturated olefin block copolymer[12] | — | 2.75 | — |
| t-butyl Perbenzoate | 2.89 | 2.89 | 3.85 |
| 2,5-Dimethyl-2,5-di(t-butyl peroxy) hexane[9] | 4.33 | 4.33 | 5.78 |
| Properties | | | |
| density, g/cc | .997 | .992 | — |
| viscosity, cps | 1596 | 2394 | 1767 |
| HDT, °C. | 98 | 98 | — |
| tensile stress, PSI | 6577 | 4074 | 6030 |
| tensile modulus, KSI | 271 | 269 | 309 |
| elongation, % | 2.76 | 1.56 | 2.36 |
| fracture energy, KJ/m² | 0.2278 | | |

TABLE III

| (1) | Ricon 159 | non-functional polybutadiene, 85-90% 1,2-vinyl, Molecular weight of 14,000, Colorado Chemical Specialties. |
| (2) | Lithene PM | Non-functional polybutadiene, 40-50% 1,2-vinyl, Molecular weight of 1,300, Special Electric Company. |
| (3) | TBS | Tertiary - butylstyrene; Dow Chemical. |
| (4) | Sr-209 | tetraethylene glycol dimethacrylate, Sartomer Co. |
| (5) | Sr-350 | Trimethylolpropane trimethacrylate, Sartomer Co. |
| (6) | IBOMA | Isobornylmethacrylate; Rohm and Haas. |

TABLE III-continued

| | | |
|---|---|---|
| (7) | BI-2000 | hydrogenated high vinyl polybutadiene, Mn = 1800; Nippon Soda Co. |
| (8) | t-Butyl perbenzoate | tertiarybutyl peroxybenzoate; Lucidol Div., Pennwalt. |
| (9) | Lupersol 101 | 2,5-dimethyl-2,5-di(t-butylperoxy) hexane; Lucidol Div., Pennwalt. |
| (10) | D-1101 | Kraton, styrene-butadiene-styrene block copolymer; Shell Chemical Co. |
| (11) | D1111-2 | Kraton, styrene-isoprene-styrene block copolymer; Shell Chemical Co. |
| (12) | G-1652 | Kraton, styrene-saturated olefin-styrene block copolymer; Shell Chemical Co. |

What is claimed is:

1. A wet filament winding resin having a viscosity which is between 1,000 and 3,000 centipose at a temperature in a range between 20° and 60° F., a density below about 1.05 grams per cubic centimeter at 25° C. after cure and a pot life which is up to about four months or more at 25° C. where pot life is defined as the time for a winding resin to reach a viscosity of 5,000 centipoise at the winding temperature, said wet filament winding resin being an intimate admixture of components consisting essentially of:

(a) a crosslinkable polymer component in an amount at least about 30% by weight of said resin by weight, said polymer component consisting essentially of unsaturated polybutadiene polymers essentially free of crosslinkable functionality other than the unsaturation thereof, 100 parts by weight of said unsaturated polybutadiene polymers being a first polybutadiene having a number average molecular weight between about 10,000 and 40,000 and a 1,2 vinyl content between about 80 and 95% based on total unsaturation present in said first polybutadiene and between about 5 and 20 parts by weight of a second polybutadiene having a number average molecular weight between about 1,000 and 2,500 and a 1,2 vinyl content between about 35 and 55% based on total unsaturation present in said second polybutadiene;

(b) between about 90 and 130 parts by weight per 100 parts by weight of said first polybutadiene of an unsaturated monomer component that has a lower viscosity than said crosslinkable polymer component, said;

(c) between about 4 and 7.5 parts by weight per 100 parts by weight of said first polybutadiene of an initiator component, said initiator component comprising a first peroxide-free radical initiator that has a 10-hour half life at a first temperature greater than 55° C. and a second peroxide-free radical initiator that has a 10-hour half life at a second temperature greater than 10° C. more than said first temperature; and (d) between about 2.5 and 35 parts by weight per 100 parts by weight of said first polybutadiene of an impact modifier component comprising a block that has a first block consisting of aromatic-alkylene units and a second block consisting of diene units whereby said block polymer is a thermoplastic elastomer.

2. A winding resin in accordance with claim 1, wherein said initiator component has an initiator selected from the group consisting of peroxyketals, peroxyesters, and dialkyl peroxides.

3. A winding resin in accordance with claim 2, wherein said aromatic-alkylene are styrene units.

4. A winding resin in accordance with claim 3, wherein said diene units are butadiene units.

5. A winding resin in accordance with claim 1, wherein a saturated polybutadiene polymer is added to the admixture.

6. A winding resin in accordance with claim 1, wherein said unsaturated monomer component comprises an aromatic-alkylene monomer and an acrylate or methacrylate monomer.

* * * * *